3,772,342
POLYCARBOXYLIC ACID ESTERS OF HALOGEN CONTAINING ALCOHOLS
Kendall F. Foley, Wilmington, Del., assignor to
Hercules Incorporated, Wilmington, Del.
No Drawing. Filed Dec. 16, 1970, Ser. No. 98,935
Int. Cl. C07c 69/82
U.S. Cl. 260—475 R  9 Claims

ABSTRACT OF THE DISCLOSURE

Benzene polycarboxylic acid esters of halogen containing monohydric alcohols having the halogen groups in a neopentyl type of structure are described. The esters, representative of which are di[2,2-bis(halomethyl)-3-halopropyl]terephthalate, di[2,2-bis(halomethyl)-3-halopropyl]isophthalate, tri[2,2 - bis(halomethyl)-3-halopropyl] trimesate and di[2,2-bis(halomethyl)-3-halopropyl]tetrahaloterephthalate, can be produced by esterifying the isophthalic, terephthalic or trimesic acid or their acid halides with the appropriate 2,2-bis(halomethyl)-3-halo-1-propanols or by transesterification techniques. The esters are of particular value as flame retardants for synthetic resins and particularly polyolefins and polyesters.

---

This invention relates to novel halogen-containing compounds which are benzene polycarboxylic acid esters of halogen-containing monohydric alcohols having the halogen groups in a neopentyl type of structure, and which find significant utility as flame retardants.

More specifically, the present invention is directed to esters having the formula

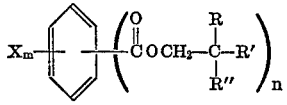

wherein R, R' and R" are independently a halo-substituted methyl group, X is halogen, n is 2 or 3 and when n is 2, the ester groups are in meta or para positions and m is 0 to 4 and when n is 3, the ester groups are in the 1,3,5 positions and m is 0 to 3.

In the above formula, X is halogen, i.e. chlorine, bromine, fluorine, or iodine, and R, R' and R" can be alike or different and each is a halo-substituted methyl group which can be —CH$_2$X, —CHX$_2$ or —CX$_3$ where X is halogen, and preferably bromine or chlorine.

Exemplary of esters represented by the above formula are di[2,2-bis(bromomethyl)-3-bromopropyl]terephthalate,
di[2,2-bis(chloromethyl)-3-chloropropyl]terephthalate,
di[2,2-bis(bromomethyl)-3-chloropropyl]terephthalate,
di[2,2-bis(chloromethyl)-3-bromopropyl]terephthalate,
di[2,2-bis(dibromomethyl)-3-bromopropyl]terephthalate,
di[2,2-bis(dibromomethyl)-3-chloropropyl]terephthalate,
di[2,2-bis(dichloromethyl)-3-bromopropyl]terephthalate,
di[2,2-bis(dichloromethyl)-3-chloropropyl]terephthalate, the corresponding isophthalate esters, di[2,2-bis(bromomethyl)-3-bromopropyl]tetrachloroterephthalate,
di[2,2-bis(bromomethyl)-3-bromopropyl]tetrabromoterephthalate,
di[2,2-bis(bromomethyl)-3-bromopropyl]tetrachloroisophthalate,
tri[2,2-bis(bromomethyl)-3-bromopropyl]trimesate,
and the like.

Esters having the above structural formula can be produced in conventional manner, as by esterifying isophthalic acid, terephthalic acid, or trimesic acid (or the corresponding halogen substituted acids) or their acid halides with monohydric alcohols having the formula

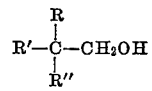

where R, R' and R" are as previously defined. Typical alcohols of this type include 2,2-bis(chloromethyl)-3-chloro-1-propanol;
2,2-bis(bromomethyl)-3-bromo-1-propanol;
2,2-bis(dichloromethyl)-3,3-dichloro-1-propanol;
2,2-bis(dibromomethyl)-3,3-dibromo-1-propanol;
2,2-bis(trichloromethyl)-3,3,3-trichloro-1-propanol;
2,2-bis(tribromomethyl)-3,3,3-tribromo-1-propanol;
2-chloromethyl-2-trichloromethyl-3,3-dichloro-1-propanol;
2-dibromomethyl-2-bromomethyl-3-bromo-1-propanol;
2,2-bis(dibromomethyl)-3-bromo-1-propanol;
2,2-bis(dibromomethyl)-3-chloro-1-propanol;
2,2-bis(dichloromethyl)-3-bromo-1-propanol;
2,2-bis(dichloromethyl)-3-chloro-1-propanol;
2,2-bis(bromomethyl)-3-chloro-1-propanol;
2,2-bis(chloromethyl)-3-bromo-1-propanol;
2,2-bis(bromomethyl)-3,3,3-tribromo-1-propanol;
2,2-bis(bromomethyl)-3,3,3-trichloro-1-propanol;
2,2-bis(chloromethyl)-3,3,3-tribromo-1-propanol;
2,2-bis(chloromethyl)-3,3,3-trichloro-1-propanol;

and the like. The above esters can also be prepared by transesterification techniques as by reacting the dimethyl or diethyl ester of terephthalic or isophthalic acid or the trimethyl or triethyl ester of trimesic acid (or the corresponding halogen substituted acids) with the appropriate alcohol, preferably in a high boiling solvent such as toluene, xylene or the like in the presence of an acid catalyst and then removing the methanol or ethanol which is formed.

The diesters of the invention are preferably prepared by reacting one mole of the desired isophthaloyl or terephthaloyl chloride with 2 moles of the alcoholic reactant at elevated temperature. The reaction can be carried out as a melt process or in an inert organic solvent for the reactants such as toluene, xylene, benzene and the like at the boiling temperature of the solvent using an esterification catalyst such as pyridine, p-toluene-sulfonic acid and the like. Most preferably, the diesters are prepared by mixing the solid chloride and alcohol reactants, heating the solid mixture to about 180° C. under reduced pressure (20 mm. Hg) for 2 to 5 hours with or without agitation, pouring the molten mixture into a large volume of cooled acetone and then collecting the crystallized product, as by filtration. The diester can be used as such or can be purified as by recrystallization from a suitable solvent and then used. The triesters are prepared in like manner using one mole of the trimesoyl chloride and 3 moles of the alcoholic reactant. The time of the reaction for the solvent process will vary from about 12 to 24 hours and usually will be about 70% complete in 15 to 20 hours. Isolation of the ester can be achieved by washing the reaction mixture to remove catalyst and/or any unreacted acid chloride (preferably first with acid and then with base) and then removing the solvent by evaporation. The ester can be used as recovered or can be purified, as by recrystallization from a suitable solvent and then used.

The monohydric alcohols having the halogen groups in a neopentyl structure and which are used to form the esters of the invention can be prepared in various ways. For example, the 2,2-bis(halomethyl)-3-halo-1-propanols are derivatives of pentaerythritol and can be prepared by reacting pentaerythritol with hydrogen halide in the manner described by J. M. Conia, P. L. Levirerend, J. L. Ripoll, Bull. Soc. Chim. France, 1803 (1961) or by cleavage of the bis(halomethyl)oxetane with hydrogen chloride or hydrogen bromide. The 2,2-bis(dihalomethyl)-3,3-dihalo-1-propanols can be prepared by oxidizing a monoester of pentaerythritol to the corresponding trialdehyde, reacting the aldehyde with phosphorus pentahalide and then cleaving the ester group to give the alcohol. The 2,2-bis(trihalomethyl)-3,3,3-trihalo-1-propanols can be prepared by reacting-2-trihalomethyl-3,3,3-trihalo-1-propenyl methyl ether (prepared by reacting hexahaloacetone with methoxymethylene triphenylphosphine, according to the Wittig reaction) with trihalomethylcarbonium ion in the presence of an alcohol, cleaving the resulting acetal to the aldehyde with dilute mineral acid and then reducing the aldehyde to the alcohol. The 2,2-bis(dihalomethyl)-3-halo-1-propanols can be prepared by cleavage of the bis(dihalomethyl)oxetanes with hydrogen chloride or hydrogen bromide, the oxetane precursor being obtained by the oxidation of bis(hydroxymethyl)oxetane to the corresponding bis(aldehyde), and subsequent reaction with phosphorus pentahalide. Mixed halo derivatives of 2,2-bis(halomethyl)-3-halo-1-propanol are preferably prepared by cleavage of the bis(halomethyl)oxetane with a hydrogen halide.

The esters of this invention are characterized by being white crystalline solids which are moderately soluble in common solvents such as toluene, methyl chloride, chloroform, acetone and the like and by being thermally stable (less than about 5% weight loss) at 300° C. They are of value as flame retardants in numerous applications but have particular value as flame retardants for synthetic resins and particularly polyolefins and polyesters. Thus flame retardant shaped articles such as fiber, film, molded articles and the like can be produced from resins containing a small amount of the esters of this invention.

The esters of the invention are illustrated by reference to the following examples in which all percentages and parts are by weight unless otherwise specified.

EXAMPLE 1

Into a reaction vessel equipped with a mechanical stirrer, thermometer, thermoregulator, condenser and gas and water traps was charged 15 parts of pentaerythritol tribromohydrin and 174 parts of toluene. The charge was heated to reflux under a nitrogen atmosphere and then 4.67 parts of terephthaloyl chloride in 35 parts of toluene was added over a 10-minute period. The charge was maintained at reflux for 20 hours, 5 drops of pyridine being added at the end of 50 minutes of reflux and 0.01 part of aluminum chloride being added after 2 hours of reflux. After the 20 hour refluxing period, the reaction mixture was cooled and the ester product was isolated by removing the toluene under vacuum at 40° C. The residue so obtained was next dissolved in methylene chloride and washed with dilute hydrochloric acid (0.5 N), dilute caustic (1.0 N) and water. After removal of the methylene chloride by evaporation and drying, a white semi-solid product was obtained. The product was then purified by trituration with anhydrous ethanol at 25° C and recrystallization from ethyl acetate, giving 5.5 parts (31% yield) of a white solid ester identified as di[2,2-bis(bromomethyl)-3-bromopropyl]terephthalate. The ester had a melting point of 179–184° C. and contained by elemental analysis 28.60% carbon, 2.66% hydrogen and 60.8% bromine (theory for $C_{18}H_{20}O_4Br_6$: 27.72% carbon, 2.58% hydrogen and 61.5% bromine). The product showed the following volatility characteristics by thermogravimetric analyses run in nitrogen at a heating rate of 10° C. per minute.

| Temperature ° C. | Weight loss (percent) |
|---|---|
| 100 | 0 |
| 150 | 0.5 |
| 200 | 1 |
| 250 | 1 |
| 300 | 6 |
| 325 | 12 |
| 350 | 34 |

EXAMPLE 2

A reaction vessel was charged with 121 parts of pentaerythritol tribromohydrin and 4.67 parts of terephthaloyl chloride which had been purified by distillation at reduced pressure. The charge was heated to 180° C. under a vacuum of 15 mm. Hg and maintained thereat for 4 hours, after which time the melt was poured into 450 parts of acetone to crystallize the product. The crystalline residue was 125 parts (89% yield) of a white solid melting at 178–183° C. and identified as di[2,2-bis(bromomethyl)-3-bromopropyl]terephthalate. Recrystallization of the ester from toluene gave an ester melting at 180–184° C. The recrystallized material showed the following volatility characteristics by thermogravimetric analysis run in nitrogen at a heating rate of 10° C. per minute.

| Temperature, ° C. | Weight loss (percent) |
|---|---|
| 100 | 0 |
| 150 | 1 |
| 200 | 2 |
| 250 | 2 |
| 300 | 4 |
| 325 | 9 |
| 350 | 26 |

EXAMPLE 3

The procedure of Example 1 was repeated except that 8.75 parts of pentaerythritol trichlorohydrin was substituted for the 15 parts of pentaerythritol tribromohydrin. The product was identified as di[2,2-bis(chloromethyl)-3-chloropropyl]terephthalate by NMR and contained 54.8% chlorine.

EXAMPLE 4

The procedure of Example 1 was repeated except that 19.5 parts of pentaerythritol tribromohydrin was used and 5.30 parts of trimesoyl chloride was substituted for the 4.67 parts of terephthaloyl chloride. The product was identified as tri[2,2-bis(bromomethyl)-3-bromopropyl]trimesate by infrared, NMR and elemental analyses. The triester had a melting point of 112–118° C. and contained 25.85% carbon, 2.32% hydrogen, and 62.86% bromine (theory for $C_{24}H_{27}O_6Br_9$: 25.49% carbon, 2.41% hydrogen and 63.61% bromine). The product showed the following volatility characteristics by thermogravimetric analysis run in nitrogen at a hearing rate of 10° C. per minute.

| Temperature, ° C. | Weight loss (percent) |
|---|---|
| 100 | 0 |
| 150 | 0.5 |
| 200 | 1 |
| 250 | 1.5 |
| 300 | 2 |
| 325 | 3 |
| 350 | 8 |
| 375 | 27 |

EXAMPLE 5

The general procedure of Example 1 was repeated except that the vessel was charged with 14 parts of pentaerythritol tribromohydrin, 4.04 parts of isophthaloyl chloride and 151 parts of toluene, the charge was heated at reflux for 60 hours and after reflux, the product solution was concentrated to a volume of approximately 40 parts. The ester product was then isolated by adding 40 volumes of ethanol to the solution and recovering the crystalline precipitate. Recrystallization of the precipitate from ethanol gave 5.3 parts (34% yield) of a white solid melting at 125–128° C. and identified as di[2,2-bis(bromomethyl)-3-bromopropyl]isophthalate. The recrystallization material contained by elemental analyses 28.37% carbon, 2.61% hydron and 61.3% bromine (theory for $C_{18}H_{20}O_4Br_6$: 27.72% carbon, 2.58% hydrogen and 61.48% bromine) and showed the following volatility characteristics by thermogravimetric analyses run in nitrogen at a heating rate of 10° C. per minute.

| Temperature, ° C. | Weight loss (percent) |
| --- | --- |
| 100 | 0 |
| 150 | 0.5 |
| 200 | 1.0 |
| 250 | 2.0 |
| 300 | 4.0 |
| 325 | 8.5 |
| 350 | 20 |
| 375 | 55 |

EXAMPLE 6

A reaction vessel was charged with 14.0 parts of pentaerythritol tribromohydrin and 4.04 parts of isophthaloyl chloride, the charge heated to about 150° C. under vacuum and the charge maintained thereat for 0.5 hour, after which time the melt was cooled to 100° C. and dissolved in 80 parts of hot toluene (about 95° C.). Decolorizing charcoal was next added to the hot toluene solution and the solution filtered. The ester product was then recovered from the toluene solution by precipitation with ethanol and cooling. Recrystallization of the precipitate from ethanol gave 8.8 parts (57% yield) of a white solid melting at 128–130° C. and identified as di[2,2-bis(bromomethyl)-3-bromopropyl]isophthalate. The diester contained 28.08% carbon, 2.60% hydrogen and 61.73% bromine (theory for $C_{18}H_{20}O_4Br_6$: 27.72% carbon, 2.58% hydrogen and 61.48% bromine).

EXAMPLE 7

The procedure of Example 6 was repeated except that 6.76 parts of tetrachloroterephthaloyl chloride was substituted for the 4.04 parts of isophthaloyl chloride, the charge was heated at 150° C. for 20 minutes, and after decolorizing with charcoal the filtered solution was concentrated to a volume of about 40 parts prior to precipitation with ethanol. Recrystallization of the precipitate from toluene/ethanol (1/1) gave 3.6 parts (20% yield) of a white solid melting at 187–189° C. and identified as di[2,2-bis-(bromomethyl) - 3 - bromopropyl]tetrachloroterephthalate. Elemental analyses showed the compound to have the formula $C_{18}H_{16}O_4Br_6Cl_4$. It had the following volatility characteristics by thermogravimetric analyses run in nitrogen at a heating rate of 10° C. per minute.

| Temperature, ° C. | Weight loss (percent) |
| --- | --- |
| 100 | 0 |
| 150 | 0 |
| 200 | 0.5 |
| 250 | 0.5 |
| 300 | 1.0 |
| 325 | 2.0 |
| 350 | 7.0 |
| 375 | 26 |

The esters of this invention possess, as stated, flame retardant properties and are useful as additives for imparting flame resistance to readily flammable synthetic resins. Thus the present invention also provides flame retardant compositions comprising a blend of a readily flammable polymer and a small amount of the esters of the invention, as well as flame retardant shaped articles therefrom. The exact amount of ester necessary to achieve flame retardancy will vary depending upon the particular ester and the type of resin employed. Usually the amount will range from about 3 to 30% by weight of the composition when the halogen in the ester is chlorine and from about 1 to about 15% when the halogen is bromine. In addition to the ester of the invention, the compositions can also contain an antimony compound such as antimony trioxide, triphenylstibine, antimony sulfide, antimony naphthenate or the like as flame retardants. The use of an antimony compound, usually in an amount ranging from 1 to 15% in combination with the esters of the invention is particularly preferred for nonfiber applications wherein its presence will not interfere with manufacturing techniques.

The resins which can be made flame retardant in accordance with this invention are any of the readily flammable thermoplastic or thermosetting rubbery or plastic resins which find utility in extrusion and molding applications. Exemplary of the polymers which can be so flameproofed include the hydrocarbon polymers including saturated, unsaturated, linear, atactic, crystalline or nonlinear amorphous polymers, copolymers, terpolymers, etc. as for example polyethylene, polypropylene, poly(4-methyl pentene-1), polybutene-1, polystyrene, styrene-butadiene rubber, butyl rubber, natural rubber, polyisobutylene, ethylene-propylene copolymer cis-1,4-polyisoprene, ethylene-propylenedicyclopentadiene terpolymer, etc. and blends of these polymers with each other. In addition, nonhydrocarbon polymers such as the unsaturated polyesters; drying and nondrying alkyd resins; the linear-saturated polyesters such as poly(ethylene terephthalate), poly-(1,4-cyclohexanedimethylene terephthalate) and poly(1,4-butylene terephthalate); polyurethanes; poly(alkylene oxides) such as poly(ethylene oxide) and poly(propylene oxide), etc.; poly(arylene oxides) such as poly(phenylene oxide), etc.; the polyamides such as nylon, perlon-L, etc.; poly(vinyl alkyl ethers) such as poly-(vinyl methyl ether), etc.; ethylene-vinyl acetate copolymers; poly(ethyl acrylate), poly-(ethyl methacrylate), etc.; polysulfone; epoxy resins; butadiene-acrylonitrile copolymers; butadiene-acrylonitrile-styrene terpolymers; plasticized poly(vinyl chloride); etc. can be made flame retardant in accordance with this invention.

The preferred polymers are homopolymers or random, block or graft copolymers of α-olefins containing from 2 to 6 carbon atoms, the polystyrenes, the polyamides, the polyurethanes and the saturated and unsaturated polyesters. Particularly preferred are the polymers of propylene. These polymers usually have molecular weights between about 100,000 and 800,000 or higher and can be produced by well known and conventional methods. Particularly useful are stereoregular or isotactic polypropylenes having a melt index range of at least about 0.3 to 20 and preferably about 3 to 5. Typical comonomers useful for the preparation of propylene copolymers include other α-olefins such as ethylene, butene-1, 3-methyl-butene-1, 4-methyl-pentene-1, dodecene-1, styrene and the like. Typical comonomers which can be grafted to the propylene polymer chain to give a so-called graft copolymer include vinyl acetate, vinyl propionate, the acrylic and methacrylic esters of aliphatic alcohols and the like.

The resin compositions can be prepared by mixing the polymer with the flame retardant, i.e. the ester of the invention and antimony compound, if present, in conventional manner, e.g. on roll mills, kneaders or extruders or by agitating in the presence of an organic solvent. Since uniform mixing of the constituents is essential to reliable results, the mixing operation when the polymer is a thermoplastic resin is preferably carried out by first dry mixing the ingredients and then subjecting the dry mixture to intensive mechanical working at elevated temperatures above the softening point of the polymer and most conveniently by means of compounding rolls, a Banbury mixer or extruder and continuing the working until a uniform mixture is obtained The compositions of the invention are suitable for the production of molded articles by the usual processing methods and are particularly suitable for the production of film, fiber and plastic molded articles.

The invention is further illustrated by the following examples which show the use of the esters of the invention as flame retardants for various resins. All parts and percentages are by weight unless otherwise specified. Throughout, the term "flame retardant" is used to designate a composition or article which will be self-extinguishing or non-burning when tested according to ASTM D-635 and will have a combustion index of at least 0.21, measured according to the method of C. P. Fenimore and F. C. Martin, "Combustion and Flame," 10, 135 (1966).

EXAMPLE 8

A molding composition was made by intimately blending 94 parts of a commercial steroregular polypropylene having a melt index of 4 and an RSV of 2.9 (determined on a 0.1% solution in decahydronaphthalene at 135° C.) and 6 parts of the ester, di[2,2-bis(bromomethyl)-3-bromopropyl]terephthalate, prepared in Example 1, on a two-roll mill at 175° C. for 10 minutes and then compression molding the blend into ⅛ inch plaques using a 4,000 p.s.i.g. press at 175° C. for 10 minutes. Flame retardancy test results on the molded plaques gave a combustion index of 0.210 and the plaques were rated as self-extinguishing according to ASTM D-635. A control treated in the same manner except that no ester was present had a combustion index of 0.178 and was rated as burning.

EXAMPLE 9

The procedure of Example 8 was repeated except that the blend was produced from 92 parts of the polypropylene, 4 parts of the ester and 4 parts of antimony trioxide in finely divided form (passed a U.S. Standard Sieve No. 200). Flame retardancy test results on the molded plaques gave a combustion index of 0.238 and the plaques were rated as non-burning according to ASTM D-635. A control treated in the same manner except that the blend contained 96 parts of polypropylene and 4 parts of antimony trioxide had a combustion index of 0.178 and was rated as burning.

EXAMPLE 10

A molding composition was prepared by mixing with vigorous agitation in a vessel 95.25 parts of a commercial polystyrene having a molecular weight of 270,000 to 280,000 (as a 10% solution in methylene chloride) and 4.75 parts of the bromine-containing ester of Example 1 and then drying the mixture under vacuum. The dried composition was ground into molding powder and molded into ⅛ inch plaques using a 4,000 p.s.i.g. press at 175° C. for 10 minutes. Flame retardancy test results on the molded plaques gave a combustion index of 0.220 and the plaques were rated as self-extinguishing according to ASTM D-635. A control treated in the same manner except that no ester was present had a combustion index of 0.183 and was rated as burning.

EXAMPLE 11

A molding composition was prepared by intimately mixing in a vessel 87 parts of a commercial, room temperature curable unsaturated polyester system comprising 16% maleic anhydride, 25% phthalic anhydride, 28% propylene glycol and 31% styrene, 9.7 parts of the bromine-containing ester of Example 1, 4.3 parts of antimony trioxide and 0.9 part of methyl ethyl ketone peroxide curing catalyst. The composition was cast in molds into ⅛ inch plaques and cured at room temperature for 24 hours. Flame retardancy test results on the molded plaques gave a combustion index of 0.251 and the plaques were rated as non-burning according to ASTM D-635. A control treated in the same manner except that no bromine-containing ester and no antimony oxide were present had a combustion index of 0.185 and was rated as burning.

EXAMPLE 12

The procedure of Example 11 was repeated except that the mixture contained 90.9 parts of the unsaturated polyester system and 9.1 parts of the ester of Example 1, no antimony oxide being present. Flame retardancy test results on the molded plaques gave a combustion index of 0.212 and the plaques were rated as self-extinguishing.

EXAMPLES 13 to 16

Various molding compositions were made by intimately blending a commercial poly(ethylene terephthalate) having an intrinsic viscosity of 0.61 (determined on a 1% solution in 60/40 phenol/tetrachloroethane at 25° C.) with various amounts of the di[2,2-bis(bromomethyl)-3-bromopropyl]terephthalate of Example 1 and any antimony trioxide, if present, in an in-line reciprocating screw injection molding machine using a barrel temperature of 285° C., and then compression molding the blends into plaques ⅛ inch x 3 inches x 3 inches long using a 4,000 p.s.i.g. press at 285° C. for 10 minutes. The plaques were then cut into the proper size strip for testing:

In these examples flammability was evaluated according to the vertical burning test UL-746 Standards for Thermoplastic Insulated Wires, 3rd Edition, 17 (1948) modified with respect to the size of the sample, height of flame and time of flame contact in order to moderate the effect of the drip characteristics of the poly(ethylene terephthalate) during ignition and to give meaningful values which measure the actual contribution of the flame retardant additive. The adopted test was vertical burning test UL-746 modified in the following three respects:

(1) The size of the test strip measured 3 inches x ¼ inch x ⅛ inch;

(2) The ignition source was a ⅜ inch diameter bunsen burner adjusted to produce a blue flame approximately ½ inch high; and (3) The flame contact time with the free end of the test strip was 5 seconds.

Details as to the amount of each component in the composition and flame retardancy test results on the test strips therefrom are given in the following Table I.

TABLE I

| | Composition (parts by weight) | | | Flame retardancy rating | |
| --- | --- | --- | --- | --- | --- |
| | Poly(ethylene terephthalate) | Bromine-containing ester | Sb$_2$O$_3$ | Combustion index | Vertical burn test (seconds) |
| Control A | 100 | | | 0.242 | >120 |
| Ex. No.: | | | | | |
| 13 | 96.8 | 3.2 | | 0.271 | 5 |
| 14 | 93.8 | 6.2 | | 0.264 | 2 |
| 15 | 97.6 | 1.6 | 0.8 | | 8 |
| 16 | 95.2 | 3.2 | 1.6 | | 4 |
| Control B | 99.2 | | 0.8 | 0.242 | *95 |

*Average of 5 tests ranging from 60 to greater than 120 seconds.

EXAMPLES 17–20

Molding compositions were prepared according to the general procedure of Examples 13 to 16 except that the compositions also contained from 31 to 33% by weight of glass fibers having an average length of 0.25 inch and a diameter of 0.0005 inch, and 0.1% to talc as a nucleating agent. The compositions were next dried at 130° C. for 16 hours and then molded into plaques according to the procedure of Examples 13 to 16. Flame retardancy results on the test strips therefrom are given in the following Table II.

TABLE II

| | Composition (parts by weight) | | | | Flame retardancy rating | |
|---|---|---|---|---|---|---|
| | Poly(ethylene terephthalate) | Glass | Bromine-containing ester | $Sb_2O_3$ | Combustion index | Vertical burn test (seconds) |
| Control C | 67 | 33 | | | 0.222 | >120 |
| Ex. No.: | | | | | | |
| 17 | 64.5 | 32.3 | 3.2 | | 0.249 | 30 |
| 18 | 62.5 | 31.3 | 6.2 | | 0.275 | 20 |
| 19 | 65.0 | 32.6 | 1.6 | 0.8 | 0.259 | 20 |
| 20 | 63.5 | 31.7 | 3.2 | 1.6 | 0.296 | 10 |
| Control D | 65.6 | 32.8 | | 1.6 | 0.238 | >120 |

EXAMPLE 21

Stereoregular polypropylene having a birefringent melting point of about 172° C. and an RSV of 2.9 (determined on a 0.1% solution in decahydronaphthalene at 135° C.) and containing 0.45% of stabilizers (0.25% of distearylthiodipropionate, 0.1% of the reaction product of 1 mole of crotonaldehyde and 3 moles of 3-methyl-6-tert-butyl phenol, and 0.1% of calcium stearate) was thoroughly blended with 2.5% of the di[2,2-bis(bromomethyl)-3-bromopropyl]terephthalate of Example 1. The blend was melt spun at 260° C. into continuous filament yarns which, after orientation and bulking gave carpet yarn of 3600 denier/100 filaments. This yarn was then used in the construction of 2 inch shag carpet by tufting the yarn into an 8 oz./yd. jute primary backing using 3.6 stitches per inch and a 2-inch pile height and then applying to the backing a styrene butadiene rubber latex in the amount of 26 oz./yd. The tufted carpet, having a face weight of 20 oz./yd. is one of the most flammable types of carpet construction. Flame retardancy of the carpet construction was then evaluated according to the Methenamine Pill Test (DOC FF-1-70), and four out of the eight of the samples passed. When the test was conducted on similar carpets prepared from filaments spun from blends containing 3.5% of the bromine-containing ester, all of the test samples passed. A control carpet prepared in the manner of the example except that no flame retardant was present completely failed the Methenamine Pill Test. Flame retardancy test results on the fibers at various stages of manufacture, i.e., after spinning, bulking and scouring gave a combustion index of 0.21.

EXAMPLE 22

Commercial poly(ethylene terephthalate) having a birefringent melting point of about 253° C. and an intrinsic viscosity of 0.61 (determined on a 1% solution in 60/40 phenol/tetrachloroethane at 25° C.) and containing 0.1% talc as a nucleating agent was thoroughly blended with 2% of the di[2,2-bis(bromomethyl)-3-bromopropyl]terephthalate of Example 1. The blend was melt spun at 290° C. and stretch oriented (4 times its length) into continuous filament yarns of 210 denier/35 filaments. The yarns were twisted into tight rolls and were heat set for 30 seconds at 300° C. to produce "sticks."

These sticks were then evaluated for flame retardancy according to the modified vertical test UL-746 described in Examples 13 to 16. The sticks of these examples gave a burn time of 10 seconds before self-extinguishment. A control prepared in the same manner except that no ester was present gave a burn time greater than 120 seconds.

EXAMPLES 23-30

Various molding compositions were prepared by intimately blending the commercial polypropylene of Example 8 with various amounts of the esters of Examples 1, 4, 5 and 7 and any antimony trioxide, if present on a two-roll mill at 175° C. for 10 minutes and then compression molding the blend into ⅛ inch plaques using a 4,000 p.s.i.g. press at 175° C. for 10 minutes. Details on the compositions and flame retardancy test results on the molded plaques are given in the following Table III.

TABLE III

| | Composition (parts by weight) | | | | Flame retardancy rating | |
|---|---|---|---|---|---|---|
| | Poly-propylene | Ester Type | Ester Amount | $Sb_2O_3$ | Combustion index | ASTM D-635 |
| Ex. No.: | | | | | | |
| 23 | 97.5 | Ex. 1 | 2.5 | | 0.212 | Self-extinguishing. |
| 24 | 95.75 | Ex. 1 | 2.5 | 1.75 | 0.235 | Non-burning. |
| 25 | 92 | Ex. 4 | 8 | | 0.212 | Self-extinguishing. |
| 26 | 91 | Ex. 4 | 6 | 3 | 0.252 | Non-burning. |
| 27 | 94 | Ex. 5 | 6 | | 0.212 | Self-extinguishing. |
| 28 | 94 | Ex. 5 | 4 | 2 | 0.240 | Non-burning. |
| 29 | 95 | Ex. 7 | 5 | | 0.212 | Self-extinguishing. |
| 30 | 94 | Ex. 7 | 4 | 2 | 0.244 | Non-burning. |

What I claim and desire to protect by Letters Patent is:

1. A halogen-containing ester of the formula

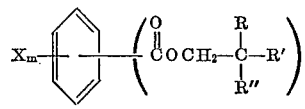

wherein R, R' and R" are independently a halo-substituted methyl group, X is halogen, n is 2 or 3 and when n is 2, the ester groups are in meta or para positions and m is 0 to 4 and when n is 3, the ester groups are in the 1, 3, 5 positions and m is 0 to 3.

2. The ester of claim 1 wherein the halo-substituted methyl group is a bromo-substituted methyl group.

3. The ester of claim 2 wherein each R, R' and R" is a bromomethyl group.

4. The ester of claim 1 which is di[2,2-bis(bromomethyl)-3-bromopropyl]terephthalate.

5. The ester of claim 1 which is di[2,2-bis(chloromethyl)-3-chloropropyl]terephthalate.

6. The ester of claim 1 which is tri[2,2-bis(bromomethyl)-3-bromopropyl]trimesate.

7. The ester of claim 1 which is di[2,2-bis(bromomethyl)-3-bromopropyl]isophthalate.

8. The ester of claim 1 which is di[2,2-bis(bromomethyl)-3-bromopropyl]tetrachloroterephthalate.
9. A compound of the formula
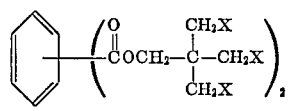
wherein X is Cl or Br, and the ester groups are in the meta or para positions.
References Cited
UNITED STATES PATENTS
3,260,672    7/1966    MacPhail et al. _____ 260—485 H
LORRAINE A. WEINBERGER, Primary Examiner
E. J. SKELLY, Assistant Examiner
U.S. Cl X.R.
260—45.85, 814, DIG. 24

PO-1050
(5/69)

UNITED STATES PATENT OFFICE
CERTIFICATE OF CORRECTION

Patent No. _____3,772,342_____  Dated___November 13, 1973___

Inventor(s)_____Kendall F. Foley_____

It is certified that error appears in the above-identified patent and that said Letters Patent are hereby corrected as shown below:

In the Claims, Claim 1, the formula -

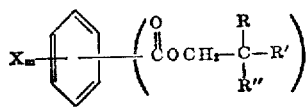

should read as follows -

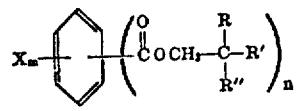

Signed and sealed this 2nd day of April 1974.

(SEAL)
Attest:

EDWARD M. FLETCHER, JR.
Attesting Officer

C. MARSHALL DANN
Commissioner of Patents